May 14, 1963  A. W. SERIO  3,089,943
FULLY IMMERSIBLE ELECTRIC FRYING PAN
Filed Aug. 10, 1960  3 Sheets-Sheet 1
FIG. 1
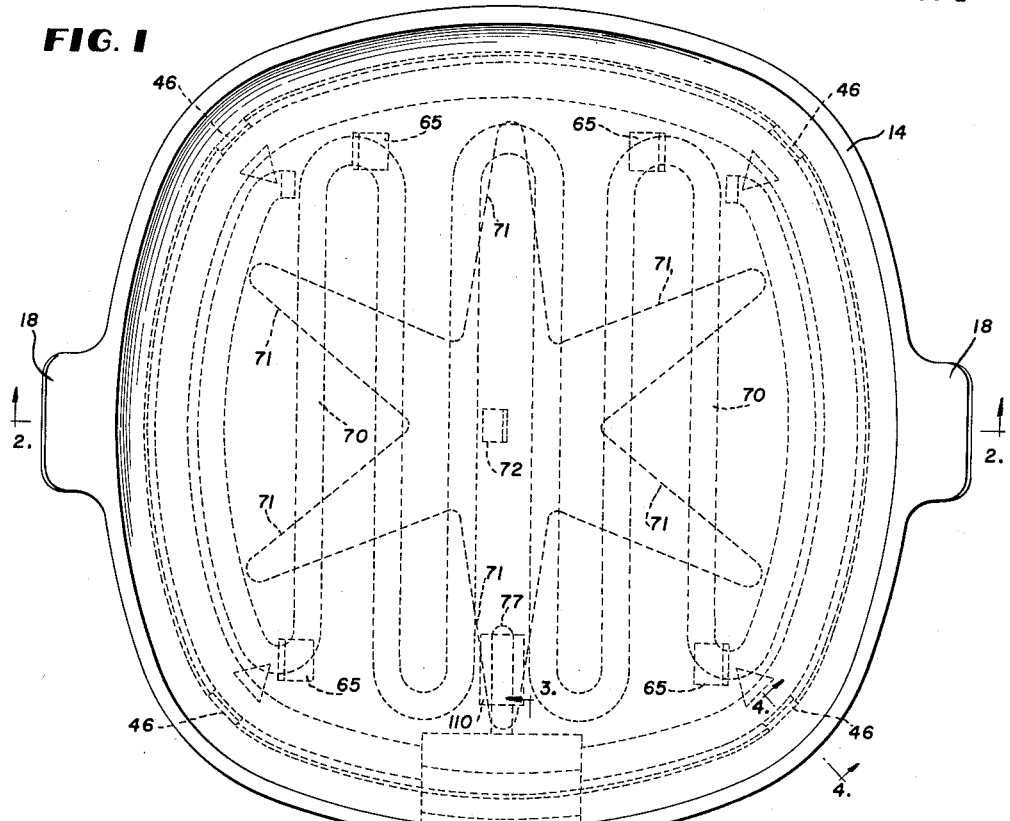
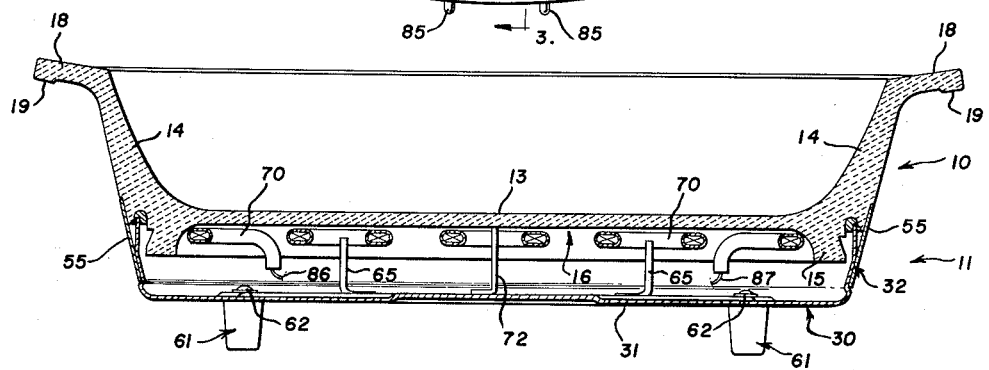
FIG. 2
FIG. 3
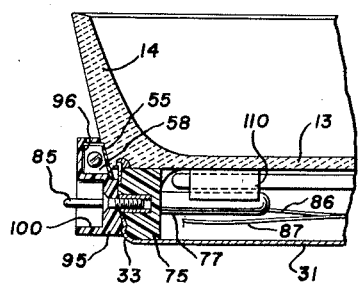
INVENTOR.
ANTHONY W. SERIO
BY
Shoemaker and Mattare
ATTORNEYS

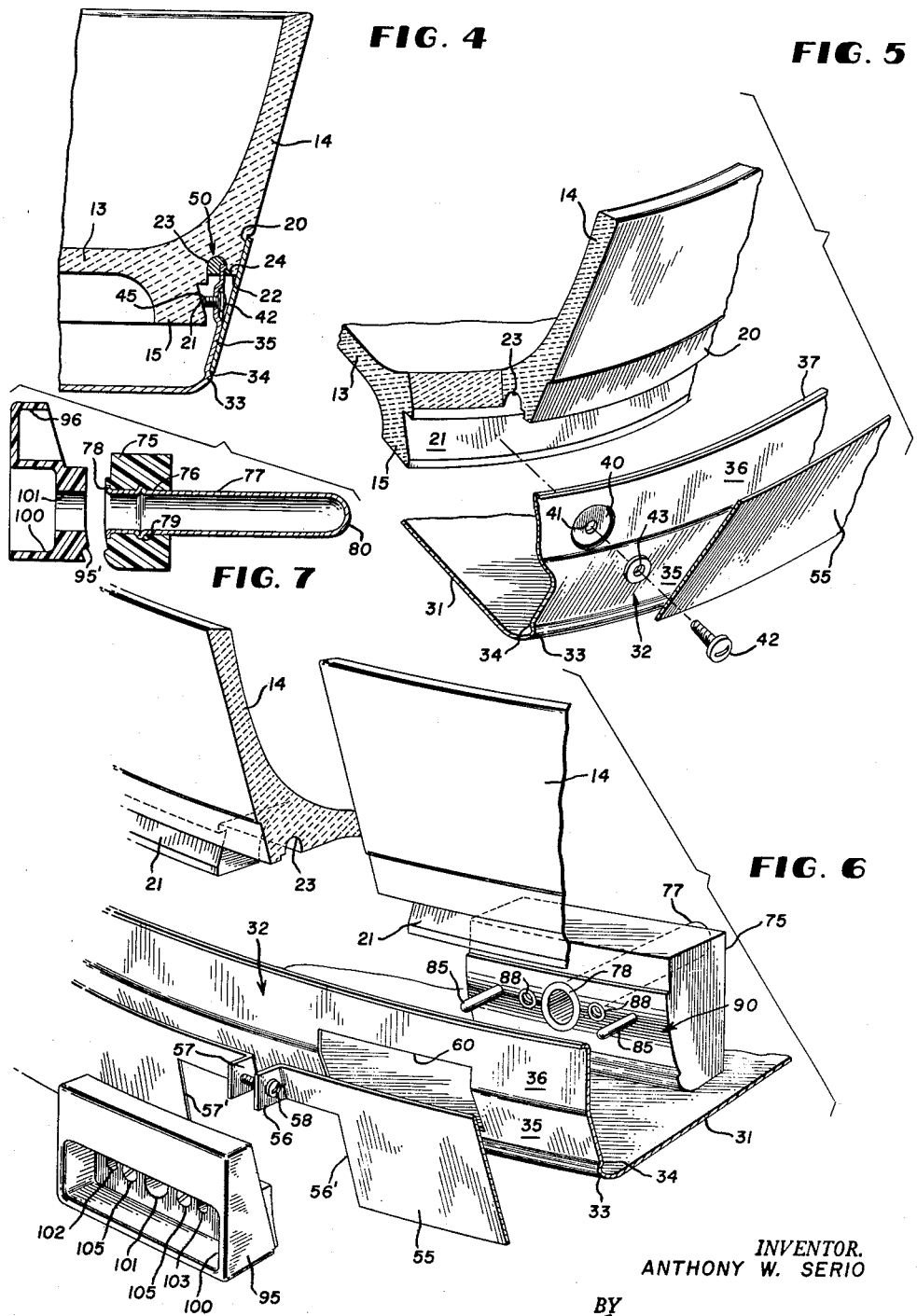

May 14, 1963 A. W. SERIO 3,089,943
FULLY IMMERSIBLE ELECTRIC FRYING PAN
Filed Aug. 10, 1960 3 Sheets-Sheet 3
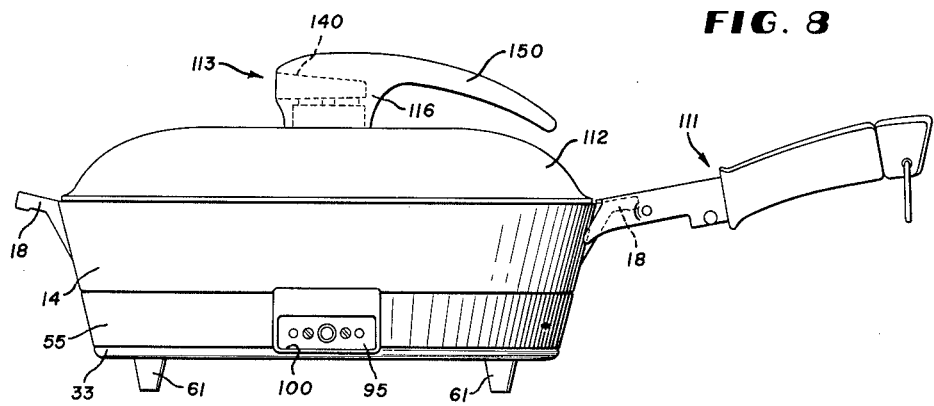
FIG. 8
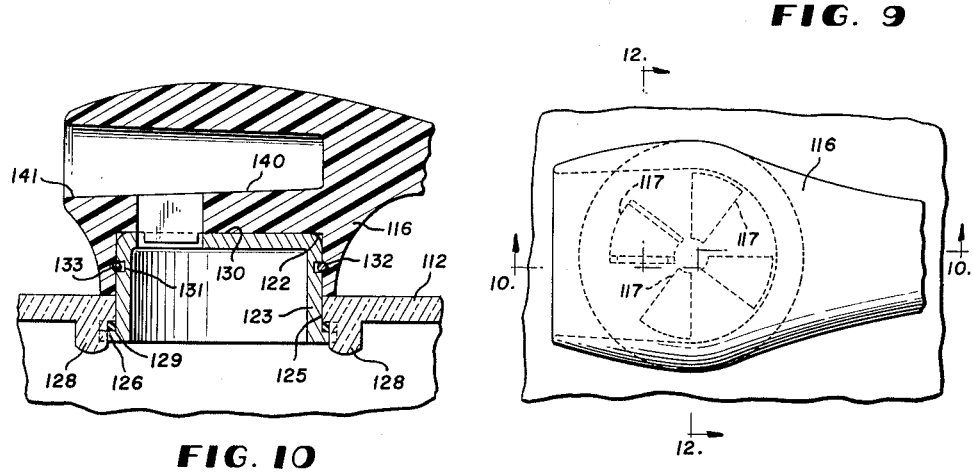
FIG. 9
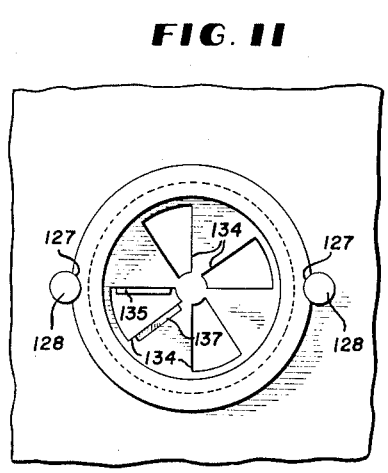
FIG. 10
FIG. 11
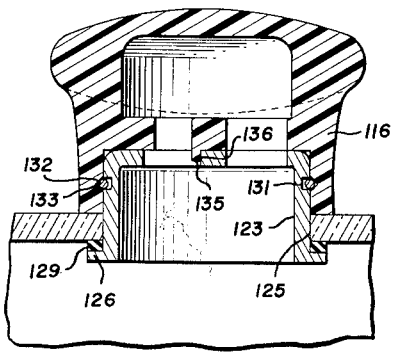
FIG. 12
INVENTOR.
ANTHONY W. SERIO
BY
ATTORNEYS United States Patent Office 3,089,943
Patented May 14, 1963

3,089,943
FULLY IMMERSIBLE ELECTRIC FRYING PAN
Anthony W. Serio, Hillcrest Road, Elmira, N.Y.
Filed Aug. 10, 1960, Ser. No. 48,769
15 Claims. (Cl. 219—44)

The present invention relates to a new and novel completely fully immersible electric frying pan and vent means therefor, and more particularly to the type of electric frying pan which is substantially automatic in operation and is controlled by a plug-in type electrical control means.

Frying pans according to the present invention are generally utilized with an automatic control means in the form of a plug-in type control which is adapted to sense the heat developed in the main body portion of the frying pan and an adjustable control is provided for heating the temperature of the frying pan to any desired degree whereupon thermostatic means is employed for automatically regulating the temperature of the frying pan.

In this type of electric frying pan, the automatic control means is disconnected or unplugged from the frying pan itself whereupon the frying pan proper can be cleaned. It is a particular object of the invention to provide a frying pan construction which permits the entire frying pan to be completely and fully immersible in liquid when it is desired to clean the frying pan. This is, of course, highly desirable since the average housewife finds it much easier to clean this type of apparatus by completely submerging it in water. Accordingly, it is necessary to provide an electric frying pan with the proper electrical connector means such that the automatic electric control can be quickly and easily connected and disconnected with respect to the frying pan and at the same time the internal electrical members of the frying pan must be sealed against the entry of moisture since such moisture would obviously cause corrosion and deterioration of the electric components and possibly cause a complete short circuit within the electrical apparatus of the frying pan.

The frying pan according to the present invention incorporates a main body means which is formed of a heat resistant material such as a ceramic substance or the like, along with a base assembly which includes the heating component as well as a casing for protecting the heating element and preventing the entrance of moisture into the lower part of the frying pan.

The base assembly includes a plurality of components which are adapted to be nested together in interlocking relationship so as to provide a fluid-tight seal with the main heat resistant body portion, and which in addition permits quick and easy assembly or disassembly of the base portion of the apparatus as desired.

Electrical connector means is provided which permits ready connection of the heating means of the frying pan to a conventional external automatic control means, and a unique arrangement is employed for ensuring that there is a fluid-tight seal between the electrical connector means and the base assembly such that no liquid can seep around the portions where the electrical connector means extends through other portions of the base assembly.

In addition, the present invention incorporates a novel construction of the base member of the base assembly so as to provide a sufficiently rigid and strong base member to withstand the forces which are normally encountered in common kitchen use. Furthermore, the over all assembly of the base in its entirety is so designed as to provide maximum strength and rigidity such that the frying pan can readily absorb any shocks or impacts to which it may be subjected particularly when being cleaned when portions of the frying pan may impinge with considerable force on the surfaces of a sink or the like within which the frying pan is being cleaned.

A particularly novel feature of the present invention is the manner in which the base member of the apparatus is simply and effectively sealed with respect to the main body means thereof. In the present invention, the main body means has provided in the under surface thereof a peripherally extending groove. Below this groove there is disposed cam means on the outer surface of the body means.

The base member of the base assembly comprises a bottom wall portion having an integral upstanding peripherally extending side wall. A plurality of cam members are supported by the side wall and extend inwardly thereof into contacting relationship with the sloping cam surfaces formed on the main body portion.

The base member is formed of a resilient material such that the side walls thereof normally spring inwardly, this inwardly directed force moving the cam members against the sloping surfaces so as to cam the upper edges of the side walls within the grooves formed in the main body means.

A sealing substance may be disposed within the groove in the main body means for ensuring that a fluid-tight seal is maintained between the upper edge of the base member side wall and the body means. In this manner, the inherent resilience of the base member itself ensures an effective fluid-tight seal in a most simple and efficacious manner.

An additional feature of the invention is the provision of a circumferentially extending clamping band means which comprises a split band which can be adjustably clamped into position within suitable recessed portions so as to strengthen and rigidify the base assembly while ensuring that the base member itself is firmly clamped in operative position, the band means additionally ensuring that the cam members mounted on the base member will be cammed up along the cam surfaces of the main body means.

The electrical connector means of the present invention includes both a plug means and a socket means which are adapted to be interconnected with one another so as to clamp adjacent portions of the base member therebetween so as to provide a completely fluid-tight seal between the base member and the electrical connector means.

An additional feature of the invention is the provision of a novel vent means which represents an improvement over the vent knob disclosed in applicant's copending application Serial No. 701,169, now Patent No. 3,047,186. In the copending application, a movable means is rotatably supported upon a hollow body means and provided with one or more apertures which can be aligned or misaligned with a corresponding aperture or apertures formed through the body means.

The difficulty that has been encountered with the device disclosed in applicant's above cited copending application has been that the exit portions of the openings in the vent knob are directed upwardly. In operating this type of a vent knob, the hand of an operator is generally positioned over the knob since this is the simplest way to grasp the knob itself. As a result, when the vent knob is turned to such a position as to exhaust steam from within a receptacle, the steam escapes directly upwardly and accordingly impinges upon the hand of the operator. This is obviously a very undesirable result since it can cause a serious burn to the operator's hand.

In the present invention, a novel vent means is provided wherein the exit portion of the opening in the movable portion of the vent means is directed in a certain lateral direction. The movable means is also provided with a handle portion which is directed in a different lateral direction, preferably in an opposite lateral direction. Accordingly, when the movable means is moved to such a position that the steam is vented from the associated receptacle, the escaping steam will be directed away from the operator's hand, thereby automatically ensuring that there will be no possibility of the operator's hand being burned.

An object of the present invention is the provision of a new and novel electric frying pan which is fully immersible and can be completely submerged within a liquid when it is desired to clean the apparatus.

Another object is to provide a fully immersible electric frying pan incorporating a novel arrangement for providing a fluid-tight seal between the base assembly and the electrical connector means associated therewith.

A further object of the invention is to provide a fully immersible electric frying pan having a separate base assembly which is quite strong and rigid when in assembled position and including a base member which is particularly designed to have maximum strength and rigidity.

Still another object of the invention is the provision of an electric frying pan including a plurality of components which are adapted to nest together and which can be quickly and easily assembled and disassembled.

Yet another object of the invention is the provision of an electric frying pan which is quite simple and inexpensive in construction, and yet which is sturdy and reliable in operation.

A still further object of the invention is to provide a novel vent means which is associated with the cover of a receptacle and which safeguards the hands of an operator and ensures that the operator's hands will not be burned when moving the vent means to open vent position.

Other objects and many attendant advantages of the present invention will become more apparent when considered in connection with the specification and accompanying drawings, wherein:

FIG. 1 is a plan view of one embodiment of a fully immersible electric frying pan according to the present invention;

FIG. 2 is a longitudinal section taken through the frying pan shown in FIG. 1, along the line 2—2 looking in the direction of the arrows;

FIG. 3 is a cross-sectional view taken along line 3—3 of FIG. 1 looking in the direction of the arrows;

FIG. 4 is a cross-sectional view taken along line 4—4 of FIG. 1 looking in the direction of the arrows;

FIG. 5 is an exploded perspective view of a portion of the apparatus illustrating the interrelationship of the cam members and cam surfaces formed on the base means and the body means respectively;

FIG. 6 is an exploded perspective view illustrating the assembly of the electrical connector means with respect to the base means and the body means;

FIG. 7 is an exploded sectional view showing the socket means and plug means of the present invention;

FIG. 8 is an elevation of an electric frying pan including a cover having associated therewith the novel vent means according to the present invention;

FIG. 9 is a top view of the vent means shown in FIG. 8;

FIG. 10 is a cross-sectional view taken along line 10—10 of FIG. 9 looking in the direction of the arrows;

FIG. 11 is a bottom view of the apparatus shown in FIG. 10; and

FIG. 12 is a cross-sectional view taken along line 12—12 of FIG. 9 looking in the direction of the arrows.

Referring now to the drawings wherein like reference characters designate corresponding parts throughout the several views, there is shown in FIGS. 1-6 the novel electric frying pan of the present invention wherein the frying pan comprises in general an upper main body means 10, and a lower base means 11, the heating means of the frying pan being housed within the base means. The main body means 10 is formed of a suitable heat resistant material such as a ceramic material which is adapted to withstand the temperatures to which the frying pan is normally subjected.

The main body means 10 comprises a lower wall 13, and an integral upstanding and outwardly sloping side wall 14 formed about the periphery of the lower wall portion 13. It will be noted as seen in FIG. 2 that an integral depending annular flange 15 extends from the lower wall 13 and defines a dome-shaped recess 16 within which the heating means is disposed.

As seen especially in FIG. 1, the body means of the frying pan defines a curved plan configuration, although the frying pan may be of any desired shape. A pair of handles 18 are formed integral with the upper edge portion of side wall 14 at opposite sides of the frying pan, these handle portions 18 being provided with lips 19 formed in the undersurfaces thereof which are adapted to cooperate with a suitable handle mechanism for enabling the handle mechanism to be clamped to the handles on the frying pan body means.

As may be most clearly seen in FIG. 4, the outer surface of side wall 14 is recessed in area 20 to provide a peripherally extending recess portion completely around the body means.

The body means is cut away at the lower outer edge thereof, and an inwardly and upwardly sloping annular surface 21 which serves as a cam means is formed completely around the body means. An under surface 22 of the body means extends peripherally around the body means and a peripheral groove 23 is formed in this under surface, the groove having a main dome-shaped cross-sectional area and a small outwardly extending arm 24.

Referring now to FIGS. 2 and 5, a base member is indicated generally by reference numeral 30, the base member including a bottom wall 31 and an upstanding peripheral side wall 32. Side wall 32 is joined to the bottom wall 31 by a curved portion 33. The portion of the side wall 32 adjacent curved portion 33 is recessed as indicated by reference numeral 34, and the side wall then continues upwardly in a first substantially flat portion 35. Flat portion 35 of the side wall then merges with a flat portion 36 of the side wall and then continues upwardly from portion 35 at an angle therefrom. The upper edge portion of flat portion 36 of the side wall terminates in an outwardly extending flange or lip 37. Suitable cam members are supported by flat portion 36 of the side wall of the base member, the side wall being provided for this purpose with embossed portions 40 having a central opening 41 formed therethrough. These openings 41 are adapted to receive self-tapping metal screws 42, a washer 43 formed of nylon or suitable material being disposed between the head of the metal screws 42 and the adjacent embossed portions of the base member side wall. Such nylon washers have a sealing effect such that when the screws are tightened in operative position, an effective fluid-tight seal is obtained between the head of the screws and the adjacent side wall of the base member.

The inner ends 45 of each of the metal screws 42 are rounded such that they are adapted to ride smoothly along the sloping cam surface 21 formed on the body means of the frying pan. While it is evident that any desired number of cam members in the form of metal screws or the like may be provided according to the present invention, the device illustrated is provided with four such cam members, the positions of which are indicated generally by reference numerals 46 in FIG. 1, it being apparent that these cam members are mounted at approximately the four corners of the frying pan as shown.

An important consideration in connection with the cam action is the fact that the base member 30 is formed of stainless steel or similar resilient and flexible material such that the side wall portion 32 thereof normally tends to flex inwardly. The dimension of the base member and the side wall thereof is such that under its normal free form condition, the side wall of the base member will tend to move the cam screws 42 inwardly against the sloping cam surface 21 on the body means. It is evident that inward movement of the cam screws will produce an upward camming motion on the entire base member thereby tending to move it upwardly as seen in the drawings toward the body means.

This upward movement of the base member under the influence of the cam means moves the upper edge of the side wall into the groove 23 provided within the under surface of the body means. In order to ensure that a good fluid-tight seal is obtained between the upper edge portion of the side wall of the base member and the body means, the space within groove 23 is filled with a sealing substance indicated by reference numeral 50, this sealing substance being disposed both inwardly and outwardly of the side wall member as seen for example in FIG. 4 thereby ensuring that no liquid can seep between the side wall of the base member and the body means. Since the upper edge of the side wall of the base member is continuous, and further since this portion is seated all the way around within the peripheral groove in the body means, it will be evident that a continuous seal is provided between the base member and the body means.

In order to further rigidify and strengthen the base structure and to further ensure that the base member is clamped in the proper operative position, a clamping band means 55 is provided, this band means being normally seated when in operative position within the recess formed in the lower outer surface of the body means and also being seated within the recess formed by the lower flat portion 35 of the side wall of the base member. It will be evident that as seen in FIG. 2, for example, when the clamping band is disposed in operative position, a substantially flush outer surface is provided for the entire frying pan assembly.

Referring now to FIG. 6, it will be seen that clamping band 55 is a split band, the opposite end portions thereof extending normally therefrom to define a pair of outwardly extending ears 56 and 57. Each of these ears is provided with a suitable threaded opening for receiving a screw 58, it being evident that advancement of the screw 58 within the threaded openings will draw the two ears 56 and 57 to clamp the band in operative position.

It will also be noted that the adjacent free end portions of the clamping band 55 are cut away at the portions indicated by reference numerals 56' and 57' to provide a substantially rectangular cut-out portion through the clamping band.

Also, as seen in FIG. 6, a substantially rectangular cut-out portion 60 is provided through the flat portions 35 and 36 of the side wall of the base member, the cut-out portion through the side wall of the base member and the cut-out portion through the clamping band being normally aligned with one another for a purpose which will hereinafter appear.

The base member is supported by suitable feet which are shown as being four in number, the feet being indicated by reference numerals 61, and formed of a suitable material such as plastic. The feet are suitably secured to the lower wall 31 of the base member as by screws 62 which extend within nuts (not shown) which are molded within the feet.

Also as seen in FIG. 1, four upstanding bracket members 65, each being of a substantially L-shaped cross-section, are provided, one leg of the L-shaped bracket members being suitably secured as by spot welding to the upper surface of the base member and the bracket members extending upwardly and having curved recesses in the upper edges thereof for supporting a heating means in the form of a heating element 70 within the recesses. Heating element 70 may be what is commonly referred to as a Calrod heating element which is a sealed electrical heating element, and as seen in FIG. 1, heating element 70 has a serpentine configuration such that it provides a substantially uniform heating effect to the lower wall 13 of the body means.

The heating element is shown as supported in operative position in FIG. 2, wherein it will be noted that the heating element is disposed closely beneath the lower wall 13 of the body means and within the dome-shaped recess 16 defined at the under portion of the body means.

In order to provide maximum strength and rigidity for the lower wall of the base member, the base member is embossed to provide extra rigidity in a well-known manner. As seen in FIG. 1, this embossing of the lower wall may take the shape of a six-pronged star-like configuration, the various legs of the star-like embossed portion being indicated by reference numeral 71. In addition, to further support and rigidify the bottom wall, a center support bracket 72 is provided, this center support bracket also being of a substantially L-shaped configuration, and being spot welded to the upper surface of the lower wall of the base member. As seen especially in FIG. 2, this center support bracket extends upwardly such that the upper edge portion thereof is in contact with the under surface of the bottom wall 13 of the main body means whereby it is apparent that the central portion of the lower wall 31 of the base member will be reinforced and better able to withstand external forces applied thereto.

As seen especially in FIGS. 6 and 7, a plug means comprises a block 75 which is formed of a suitable heat-resistant plastic material such as the material identified by the trademark Durez, Reg. No. 18,403 manufactured by Durez Plastics and Chemicals, Inc.

As seen especially in FIG. 7, the plug member 75 is provided with a central opening 76 extending therethrough, and a thin-walled tube 77 is mounted within this central opening. It will be noted that tube 77 is provided with a lip 78 at the open end thereof which fits within a suitable groove in the plug member 75 and an outwardly extending peripheral flange portion 79 of the tube is seated within a corresponding groove formed in the plug member. In this manner, the tube is maintained in tight sealing relationship with the plug member 75, it being evident that the inner end 80 of the tube is closed so that a completely sealed unit is provided.

Also mounted within the plug member 75 as seen in FIG. 6 are a pair of relatively conventional electrical connector prongs 85, these prongs extending outwardly of the member as seen in FIG. 6 and also extending inwardly (not shown) and being connected with leads 86 and 87 extending from the opposite ends of the heating element as indicated in FIGS. 2 and 3.

In addition, a pair of molded nuts are embedded within plug member 75 and extend only partially therethrough. The outer ends of these molded nuts are indicated by reference numerals 88 in FIG. 6.

When in the assembled position as seen in FIG. 3, for example, it will be noted that the dimensions of the plug member 75 are such that the upper edge thereof fits flush with the under surface of the bottom wall 13 of the body means while the lower surface of the plug member 75 fits flush with the upper surface of the bottom wall 31 of the base member. In addition, the outer surface of the plug member 75 is so configured as to fit snugly against the inner portion of the side wall of the base member, and a raised central portion indicated generally by reference numeral 90 in FIG. 6 fits snugly within the cut-out portion 60 formed through the side wall of the base member.

A socket means includes a socket member 95 formed of a suitable plastic material or the like, socket member 95 having a lower inner wall portion which is adapted to fit flush up against the raised portion 90 of the plug member and including a lower surface 95' which fits around the curved portion 33 of the base member. As seen in FIG. 3, this permits the socket member 95 to be brought up into flush engagement with the outer surface of the side wall of the base member.

In addition, the upper portion of the socket member 95 is provided with a substantially rectangular recess 96 which receives the ears 57 and 58 of the clamping band 55. The upper edge portion of the socket member fits flush against the outer surface of side wall 14 of the body means, and accordingly, a nice finished appearance is provided while the ears of the clamping band are completely hidden from view.

As seen particularly in FIG. 6, the socket means is provided with a recess 100 in the outer surface thereof which is adapted to receive an automatic control plug as discussed previously. A central opening 101 is provided through the socket member which is adapted to be aligned with the hollow tube 77 mounted within the plug member.

A pair of openings 102 are provided through the plug member and the electrical prongs 85 and 86 extend through these openings so as to be available for engagement with suitable sockets formed in the external automatic control plug.

In order to retain the socket member in its operative clamped position as seen in FIG. 3, a pair of flat-headed bolts 105 extend through suitable openings provided in the socket member and are threaded into the molded nuts provided in the plug member. When the socket member is so clamped in operative position, it will be noted that the adjacent portions of the side wall of the base member are tightly clamped between the faces of the plug member and the socket member as seen in FIG. 3.

It will, of course, be evident that when in the operative clamped position as seen in FIG. 3, the electrical connector means including the electrical prongs along with the leads connected with the heating element are completely sealed with respect to the outside of the base member such that no liquid can possibly leak into the interior of the base member once the apparatus is in the clamped operative position as shown in FIGS. 2 and 3.

The hollow tube 77 is adapted to receive a heat control rod of an external automatic control plug, this heat control rod operating in a well-known manner to sense the temperature of the frying pan and to automatically adjust the amount of current passing through the heating element by well-known thermostatic means. In order to ensure that a heat control rod within tube 77 will be subjected to the actual temperature of the body means of the frying pan, a downwardly extending lug 110 is formed integral with the under surface of the lower wall 13 of the body means, this lug 110 being provided with a recess of arcuate cross-section which snugly receives the upper curved surface of tube 77. In this manner, it is evident that the temperature of the body means of the frying pan will be effectively transmitted to the wall of the tube 77 and thence to the heat control rod which may be disposed therein.

It is apparent that the foregoing arrangement provides a very simple and effective construction which positively ensures that a fluid-tight seal will be obtained between the base assembly and body means at all times. The cam means and the surrounding clamping band ensure that the upper edge portion of the side wall of the base member will be maintained in sealing relationship within the groove in the body means. In addition, the electrical connector members and particularly the plug member 75 and the socket member 95 are so clamped together and interconnected that no leakage can take place around the portions where the electrical connector means extends through the side wall of the base member and the clamping band. Accordingly, no moisture can enter the space between the base member and the body means of the frying pan which might tend to damage or injure the heating means disposed therein.

It will be noted that as seen in FIG. 2, a substantial space exists between the lower portion of the body means of the frying pan and the lower wall of the base member. In order to provide good heat insulation and to further insure that the maximum amount of heat from the heating element is effectively heating the body means proper, the space below the heating element between the under surface of the heating element and the upper surface of the lower wall 31 of the base member is preferably filled with a suitable heat-insulating means such as glass wool and the like (not shown).

Referring now to FIGS. 8–12 of the drawings, the novel vent means is disclosed in combination with the aforedescribed frying pan structure. As seen in FIG. 8, the side wall 14 of the body means slopes downwardly and merges substantially flush with the outer surface of the clamping band 55. At the lower portion of the base of the frying pan, the curved portion 33 of the base member is visible. Of course, the entire structure is supported by the feet 61.

The handles 18 are shown as extending from diametrically opposite portions of the frying pan and a detachable handle mechanism 111 is detachably secured to the right-hand handle portion 18 as seen in FIG. 8. The socket member 95 is seen to extend outwardly of the clamping band 55 and the recess 100 of the socket member is seen to be readily available for plugging in an external automatic control plug when desired.

As seen in FIG. 8, a cover 112 is fitted on the upper edge portion of the body means of the frying pan. The vent means is indicated generally by reference numeral 113 and is supported at the central portion of the cover 112.

Referring now to FIGS. 9–12, the vent means of the present invention includes a movable body means 116 having four substantially sector-shaped equally spaced openings 117 formed therethrough as seen most clearly in dotted lines in FIG. 9. Member 116 may be formed of any suitable material, preferably heat insulating such as plastic and the like. Member 116 is also provided with a substantially cup-shaped cavity 122 in the lower surface thereof.

A hollow, substantially cylindrical body means 123 fits within the cup-shaped cavity in member 116 and extends through an opening 125 provided through the center of the cover 112. Body means 123 is provided with an annular radially extending flange 126 at the lower end thereof, the flange being provided with two diametrically opposite indentations 127, within which are received two downwardly extending lugs 128 formed integral with the lower surface of cover 112.

In this manner, the body means 123 is constrained from rotation with respect to the cover during operation of the device. An annular ring 129 formed of a suitable resilient material such as a heat-resistant soft rubber or the like is disposed on the upper surface of flange 126 in order to ensure that the body means will be clamped in proper operative position regardless of slight variations in thickness of the covers with which the vent means is employed. Body means 23 may be formed of sheet aluminum, for example, although other suitable materials may be employed. The upper surface 130 of body means 123 is substantially flat and four openings 134 substantially identical with those formed through member 116 are provided through the upper wall of body means 123. An annular groove 131 is formed in the outer surface of body means 123 and an annular groove 132 of substantially U-shaped cross-sectional configuration is formed in the inner surface of member 116. A resilient split ring 133 is disposed in the adjacent grooves as seen most clearly in FIGS. 10 and 12. When in assembled position, ring 133 maintains movable means 116 and body means 123 in the relative vertical relationship shown in the drawings, but enables these members to rotate with respect to one another.

When, however, it is desired to disassemble member 116 from member 123, the U-shaped configuration of groove 132 provides a camming action upon ring 133 such that upon relative vertical movement upon these members, ring 133 is forced into groove 131 thereby permitting movable means 116 to be removed from body means 123. When assembling these two components, ring 133 is again forced down into groove 131 until groove 132 is adjacent to groove 131 whereupon ring 133 will expand into the position shown in the drawings.

Movable means 116 is journaled upon the upper flat surface 122 of body means 123 and also engages the upper surface of cover 112 whereby the assembled vent means securely clamps the edges adjacent opening 125 in the cover between the lower surface of the movable means 116 and the upper surface of resilient annular member 129.

As seen most clearly in FIG. 12, movable means 116 is provided with a downwardly extending lug 135 which serves as a stop means for limiting relative movement of member 116 with respect to body means 123. As seen in FIG. 12, movable means 116 is at one limit of movement wherein lug 135 engages the lateral surface 136 of one of the openings 134 through body means 123. At the opposite limit of angular movement of movable means 116, lug 135 fits within and engages the lateral surface of recess 137 formed in body means 123 adjacent one of the openings 134 thereof. At one limit of angular movement of member 116 as seen in the drawings, openings or apertures 117 through movable means 116 and the openings or apertures 134 through body member 123 are in alignment with one another, and at the opposite limit of angular movement of body means 116, apertures 117 and 134 are out of alignment such that the apertures 134 through body means 123 are completely covered. It is evident that movable means 116 may be rotated to an intermediate position to only partially uncover the apertures 134 as desired.

As seen in FIG. 10, a substantially horizontally or laterally extending cavity 140 is provided in the upper portion of movable means 116, the cavity having an open end 141 which serves as the exit portion for vented steam from the interior of the associated receptacle, whereby it is apparent that the vented steam will be directed in a lateral horizontal direction. Each of the openings 117 formed through the lower portion of the movable means 116 extends upwardly to and is in communication with cavity 140.

It is accordingly apparent that when the apertures 117 of the movable means 116 are aligned with the apertures 134 through the body means 123, any steam tending to rise within the receptacle will be vented upwardly through openings 117, and thence outwardly and through the exit portion 114 of the cavity 140 formed in the upper part of the movable means.

Referring now to FIG. 8, movable means 116 is also provided with an integral handle portion 150, the handle portion extending laterally from the movable means and being spaced above the upper surface of the cover such that an operator's hand can be placed around the handle portion 150 for manually operating the vent means. As shown, the handle portion 150 is directed in the opposite direction from the direction in which the steam is emitted from the exit portion 141 of the movable means.

It is accordingly apparent that when the operator grasps portion 150 and moves the movable member to vent position, the operator's hand will be automatically protected from the steam since the operator's hand will be at the opposite portion of the movable means from which the steam is emitted, and accordingly, there is no possibility that the steam will impinge upon the operator's hand.

It is noted that although four apertures have been shown in the body means and movable means, only one aperture or any other number may be provided as desired. The configuration of the apertures may also be varied, the sector-shaped configuration as shown in the drawings being considered preferable. Also, the handle means may be of a different configuration if desired, and may not necessarily be directed diametrically opposite to the exit portion of the vent means as long as the handle is in such a position that an operator's hand when on the handle will not be in the path of the steam emitted from the vent means.

It is apparent from the foregoing that there is provided a new and novel automatic frying pan which may be fully immersed in a liquid when it is desired to clean the apparatus. A novel arrangement is incorporated for providing a fluid-tight seal between the electrical connector means and the base of the assembly. The over all assembly is particularly designed and constructed to provide a strong and rigid assembly and in addition means is provided for rigidifying and strengthening the base member. The frying pan incorporates a plurality of components which nest together and which can be quickly and easily assembled or disassembled when desired.

The apparatus is quite simple and inexpensive in construction and yet sturdy and reliable in operation. A novel vent means is also provided to ensure that an operator's hand will not be burned by steam emitted from the vent means when the vent is moved to its open venting position.

As this invention may be embodied in several forms without departing from the spirit or essential characteristics thereof, the present embodiment is therefore illustrative and not restrictive, since the scope of the invention is defined by the appended claims and all changes that fall within the metes and bounds of the claims or that form their functional as well as conjointly cooperative equivalents, are therefore intended to be embraced by those claims.

I claim:

1. A fully immersible electric frying pan comprising a frying pan body means formed of heat resistant material, cam means on said body means, and base means for said frying pan, said base means including a base member formed of resilient material, said base member including an upstanding peripheral wall, and means supported by said base member and normally resiliently biased toward and engaging said cam means for normally producing a cam action which tends to move the base means toward the frying pan and into sealing cooperative relationship therewith.

2. A fully immersible electric frying pan including a body means having an under surface, a peripheral groove formed in said under surface, a base means including a base member, said base member having an upstanding wall formed at the outer edge portions thereof, said body means having cam means thereon comprising spaced outwardly facing sloping surface portions, a plurality of spaced inwardly projecting means supported by the wall of the base member and engaging said cam means for normally urging the base member toward said body means, whereby the upper edge portion of said wall is normally urged into said groove for providing a fluid-tight seal between said body means and said base member.

3. Apparatus as defined in claim 2, including a sealing substance disposed within said groove and engaging the upper edge portion of said wall to ensure a fluid-tight joint between the upper edge portion of the wall and the body means.

4. A fully immersible electric frying pan comprising a body means formed of heat resistant material, said body means including cam means, a base member including an upstanding peripheral wall portion, inwardly extending means supported by said peripheral wall portion and engaging said cam means for urging the upper edge portion of said wall into sealing relationship with said body means, a band means disposed in surrounding relationship to said wall portion and in abutting engagement with at least a part of said wall portion, electrical heating means positioned between said base member and said body means, and electrical connecting means extending through said band means and said base member and being connected to said heating means.

5. A fully immersible electric frying pan including a body means formed of heat resistant material, cam means formed on said body means, and a base member including a lower wall and an upstanding peripheral wall, means on said upstanding wall engaging said cam means and cooperating therewith to cam said base member toward said body means to urge the upper portion of said wall into sealing relationship with said body means, the lower wall of said base member being spaced from the under surface of said body means, a heating means supported within the space between said body means and said base member, a band means disposed in surrounding relationship to said base member, and electrical connector means extending through said base member and said band means to provide an electrical connection with said heating means, said electrical connector means having a fluid-tight seal with respect to said base member, and said base member having a fluid-tight sealing relationship with said body means whereby the entire frying pan may be fully immersed in a liquid while preventing any liquid from infiltrating into the space between the base member and the body means.

6. A fully immersible electric frying pan comprising a body means, said body means including an under surface having a groove formed therein, a base member including a lower wall and an upstanding peripheral wall, means supported by said upstanding wall and being in engagement with said cam means for normally urging said base member toward said body means such that the upper edge portion of said upstanding wall enters the groove formed in the body means, means disposed within said groove to ensure a fluid-tight seal between said body means and said upstanding wall, the lower wall of said base member being spaced from the lower portion of said body means to thereby define an open space, heating means disposed within said space and being positioned closely adjacent said body means, a clamping band means disposed in surrounding relationship to and abutting a portion of said base member, the upstanding wall of said base member and said band means including cutout portions, and electrical connector means extending through said upstanding wall and said band means and forming a fluid-tight seal between the electrical connector means and the base member and band means, said electrical connector means being electrically connected with said heating means for supplying electrical current from the exterior of the apparatus to the heating means, whereby the entire frying pan may be fully immersed in liquid and no liquid will be permitted to leak into the space between the base member and the body means.

7. A fully immersible electric frying pan including a body means having sloping cam means formed thereon, a base member including a bottom wall and an upstanding peripherally extending side wall, a plurality of members supported by said side wall and extending inwardly thereof and engaging said sloping cam means for normally camming the base member toward said body means, thereby urging the base member into sealing relationship with the body means, a clamping band means disposed in surrounding relationship to said base member and being in abutting relationship with a portion of said base member and a portion of said body means, said base member and said band having cut-out portions formed therethrough, a plug means including electrical connector means, the bottom wall of said base member being spaced from said body means, heating means disposed between said bottom wall of the base member and the body means, said electrical connector means being electrically connected with said heating means, said plug fitting within the cut-out portion formed in said base member, and socket means, means for operatively connecting said socket means with said plug means, said socket means extending within the cut-out portion formed in said band means.

8. A fully immersible electric frying pan comprising a body means formed of heat resistant material, said body means including an under surface, said under surface having a peripherally extending groove formed therein, a sloping cam means formed on said body means, a base member including a bottom wall and an upstanding peripherally extending side wall, a plurality of cam members supported by said wall and extending inwardly into engagement with said cam means, said base member being formed of resilient material such that said cam members are normally urged in an inward direction to thereby cam the base member toward said body means to move the upper edge portion of the side wall of the base member into said groove, a sealing substance disposed within said groove and contacting the upper portion of the upper edge portion of said side wall to ensure a fluid-tight seal between the base member and the body means, the bottom wall of said base member being spaced from said body means to define an open space, a heating means disposed within said space, and electrical connector means extending through said base member and having a fluid-tight relationship therewith, said electrical connector means being electrically connected with said heating means, whereby the entire frying pan may be fully immersed in a liquid, and a completely fluid-tight seal is provided for preventing liquid from entering said space.

9. Apparatus as defined in claim 8, including a first peripherally extending recess defined by said body means and a second peripherally extending recess defined by said base member, and a clamping band means surrounding said body means and said base member and seated within said recesses for rigidifying and strengthening the over all assembly.

10. Apparatus as defined in claim 8, wherein the bottom wall of said base member is provided with an embossed portion for strengthening the bottom wall of the base member, and an upstanding support member secured to said base member and engaging said body means for reinforcing the base member.

11. A fully immersible electric frying pan comprising a body means formed of heat resistant material, said body means including an under surface having a peripherally extending groove formed therein, a peripherally extending cam means formed on said body means and sloping upwardly and inwardly with respect to the body means, a base member comprising a bottom wall and an upstanding peripherally extending side wall having an upper edge portion, a plurality of cam members supported by said side wall and extending inwardly of the side wall and engaging said sloping cam surfaces, said base member being formed of resilient material such that said side walls normally tend to spring inwardly thereby moving the cam members against said cam surfaces to cam the base member upwardly and move the upper edge portion of the side wall of the base member into said groove, a sealing substance disposed within said groove to ensure a fluid-tight seal between said body means and said base member, the bottom wall of said base member being spaced from said body means to provide an open space therebetween, heating means disposed within said space, a clamping band disposed in surrounding relation to a portion of said body means and a portion of said side wall of the base member and being in engagement therewith for strengthening and rigidifying the assembly, the side wall of said base member and said clamping band having cut-out portions formed therein and aligned with one another, and electrical connector means extending through said cut-out portions and forming a fluid-tight seal with said base member, said heating means being electrically connected with said electrical connector means.

12. Apparatus as defined in claim 11, wherein said clamping band is a split band, and means for tightening said split clamping band about said base member and said body means for firmly clamping the assembly in operative position.

13. Apparatus as defined in claim 11, wherein said electrical connector means includes a plug means extending within the cut-out portion formed through the side wall of said base member, and a socket means disposed within the cut-out portion formed through said band means, and means for operatively connecting said socket means to said plug means and clamping said base member between said plug means and said socket means for providing said aforementioned fluid-tight seal with the base member.

14. Apparatus as defined in claim 13, wherein said plug means includes an opening formed therethrough, a tubular member supported within said opening and extending inwardly of said plug means, the inner end of said tubular member being closed to thereby provide a hollow sealed tube extending inwardly from said plug means, and an opening formed through said socket means and being in communication with the whole interior of said tubular member, and lug means depending from said body means for engaging said tubular member, said tubular member being adapted to receive a heat control rod to sense the temperature of the body means of said frying pan.

15. A fully immersible electric frying pan comprising a body means formed of heat resistant material, said body means including an under surface having a peripherally extending groove formed therein, sloping cam means formed on the outer lower portion of said body means and sloping inwardly and upwardly with respect to the body means, a base member including a lower wall and an upstanding peripherally extending wall formed at the outer edge thereof, said upstanding wall including an upper edge portion, a plurality of cam members supported by said side wall and extending inwardly thereof and engaging said sloping cam surfaces, said base member being formed of resilient material such that said side walls normally spring inwardly of the base member thereby moving said cam members against said sloping cam surfaces for urging the upper edge portion of said side wall into said groove, a sealing substance disposed within said groove and engaging the upper edge portion of the side wall for ensuring a fluid-tight seal between the base member and the body means, said bottom wall of the base member being spaced from said body means to provide an open space therebetween, heating means disposed within said open space and supported adjacent said body means, said body means and said base member defining peripherally extending recessed portions, a split band member disposed in surrounding relationship to said body means and said base member and seated within said recessed portions, means for tightly clamping said band means about said body means and said base member and in abutting relationship therewith, the side wall of said base member and said band means having cut-out portions formed therethrough and aligned with one another, a plug means including a portion extending within the cut-out portion formed in said base member, and a socket means including a portion extending within the cut-out portion of said band means, means for securing said socket means to said plug means and to tightly clamp the adjacent side wall of the base member tightly between said plug means and said socket means to provide a fluid-tight seal between said plug means and said socket means, and electrical connectors extending outwardly of said socket means and being connected inwardly of said plug means with said heating means, whereby an external electric source may be operatively connected with said heating means, and further the entire electric frying pan may be fully immersed within a liquid and the fluid-tight seal between the various components will prevent the entry of any moisture within the space between said base member and said body means.

References Cited in the file of this patent

UNITED STATES PATENTS

| | | |
|---|---|---|
| 910,479 | Andrews | Jan. 19, 1909 |
| 1,047,088 | Kuhn | Dec. 10, 1912 |
| 1,422,935 | Dean | July 18, 1922 |
| 2,234,547 | Bazzoni | Mar. 11, 1941 |
| 2,428,894 | Serio | Oct. 14, 1947 |
| 2,690,853 | Kircher | Oct. 5, 1954 |
| 2,937,261 | Jepson | May 17, 1960 |
| 2,938,990 | Levine | May 31, 1960 |

FOREIGN PATENTS

| | | |
|---|---|---|
| 372,590 | Germany | Mar. 29, 1923 |
| 215,539 | Great Britain | May 15, 1924 |